July 15, 1958     G. J. WALKEY ET AL     2,842,801
METHOD OF REPAIRING THERMOPLASTIC DIES
Filed Feb. 14, 1952     2 Sheets-Sheet 2
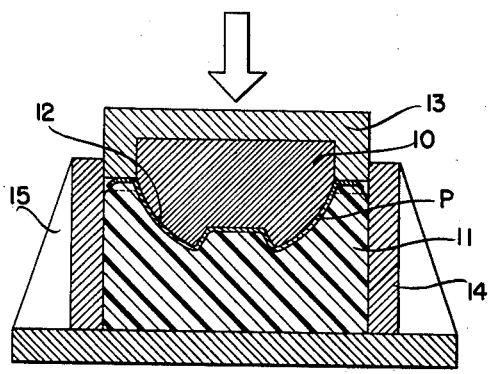
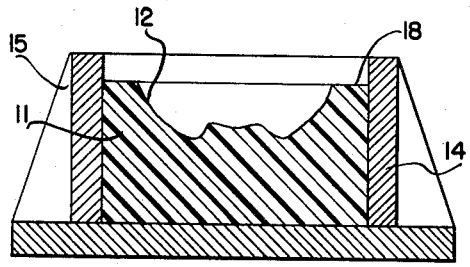
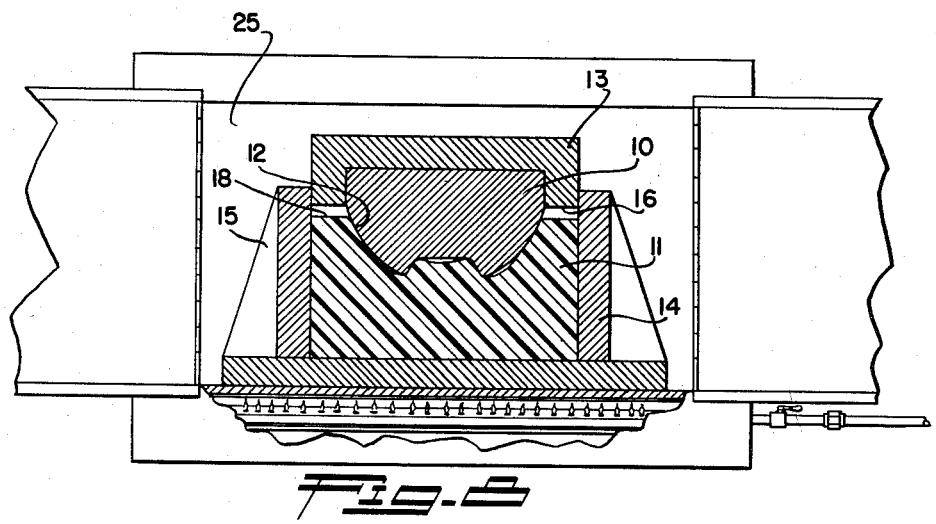
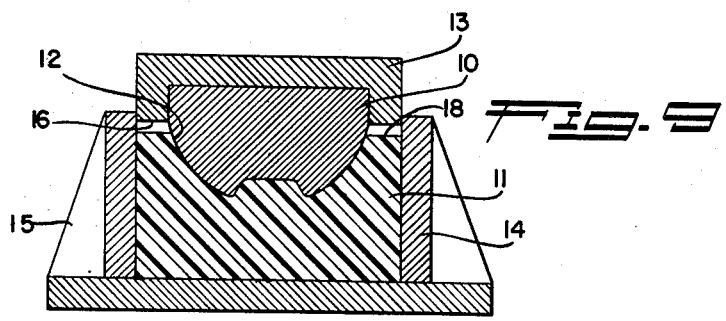
INVENTORS
GEORGE J. WALKEY
BY   CLIFTON P. MC GREGOR
Agent

United States Patent Office 2,842,801
Patented July 15, 1958

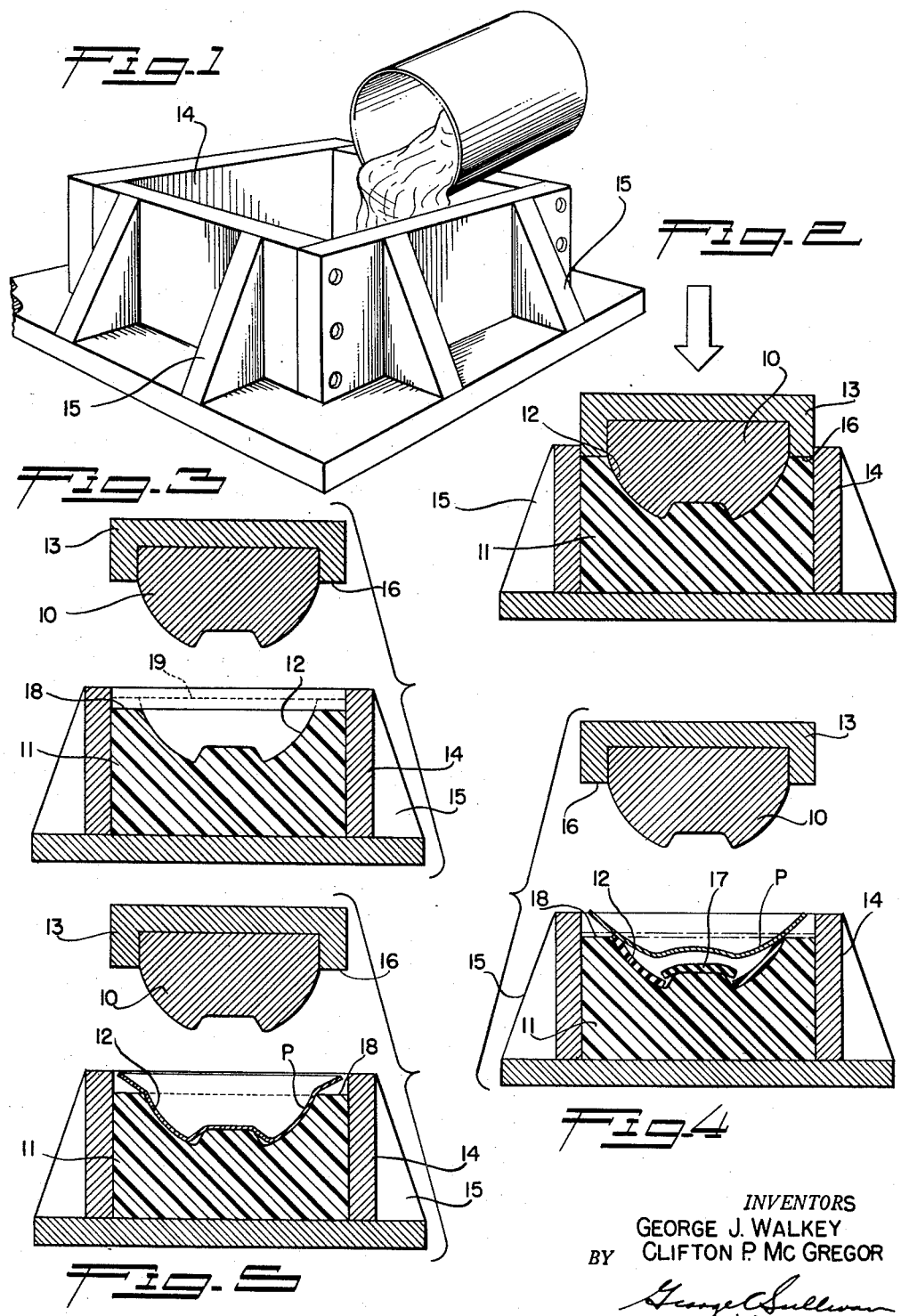

2,842,801

METHOD OF REPAIRING THERMOPLASTIC DIES

George J. Walkey, Burbank, and Clifton P. McGregor, North Hollywood, Calif., assignors to Lockheed Aircraft Corporation, Burbank, Calif.

Application February 14, 1952, Serial No. 273,122

1 Claim. (Cl. 18—59)

This invention relates to tools and methods for forming sheet metal, and the like, and relates more particularly to sheet metal forming dies such as are used in drop hammers, hydraulic presses, mechanical crank presses, etc., and to the methods of making and reconditioning the same.

In the forming of sheet metal parts, for example, aircraft parts of aluminum alloy, steel, stainless steel, etc. it is the common practice to form them between male and female dies operated in drop hammers, hydraulic presses, or the like. These dies are usually constructed of metal, such as steel or alloys such as Kirksite (a lead and zinc alloy). The manufacture of such tooling from steel is, of course, extremely costly and time consuming. Where the tooling is to be used for relatively limited production runs, as in the aircraft industry, the dies are often made of Kirksite, or similar alloys, to reduce the cost but even this procedure is costly as it involves the making of masters of plaster of Paris, the production of so-called splashes from the masters, and the casting of the dies from these splashes. The tooling also requires subsequent grinding, polishing, bluing, etc. and the taking into account the gage or thickness of the sheet metal to be formed.

Attempts have been made to avoid the use of expensive metal dies by employing plastics in the manufacture of the male die or punch. However, so far as we are aware, these attempts have not been successful. Thermosetting plastics were employed which could not be successfully reworked after wear or minor breakage, and the hardness and character of these plastics are such that the tooling was not dimensionally stable and often split or cracked in use. The tendency for such plastics to shrink shortly after being cast and thereafter to continue to shrink over a long period of time, made it difficult, if not impossible, to obtain and preserve the necessary accuracy, particularly as the plastic was hard and unyielding so that the gage or thickness of the sheet metal to be formed had to be accurately taken into account in mating or matching up the male and female dies.

Another object of the invention is to provide a method for making a plastic die of this character that avoids the problem of shrinkage inherent in other plastic dies with which we are familiar. The die is poured, cast or molded under pressure directly to the companion die or punch, thereby avoiding the initial shrinkage and is itself yieldable so that any minor subsequent shrinkage is of no moment. In larger dies or when an extremely accurate die face is desired, the surfaces of the die cavity, formed as just mentioned, are heated by a torch or by radiant heating and the punch is again nested in the die cavity and subjected to pressure to further shape or mold the die surface. If desired or believed necessary, additional liquid plastic may be poured into the die cavity before re-inserting the punch, this added plastic being pressure bonded or welded to the body of the die. These post operations compensate for any excessive shrinkage of the die material and assure smooth accurate die surfaces.

Another object of the invention is to provide a rapid inexpensive method for making and maintaining a die of this character. The plastic for the die is poured into a box or tub in a liquid or viscous state and the punch or male die is lowered into the plastic and thereafter urged against the plastic by gravity or additional pressure so that the plastic is pressure molded directly in its operating tub and directly to the punch with an appropriate parting material on the surfaces of the punch. Thereafter, after extended use of the die, it may become worn or misshapen. The die is easily repaired or reconditioned by merely nesting the die and punch together under gravity or with additional pressure and the die and punch thus nested are maintained at an elevated temperature for an appropriate period of time to recast or reshape the thermo-plastic die to the punch. This restores the die for subsequent reuse. In addition, any minor cracks, nicks, or the like, in the thermo-plastic die may be readily repaired by locally heating the same and shaping the plastic to the proper contours with or without adding plastic thereto.

Other objectives and features of the invention will become apparent from the following detailed description of a typical preferred embodiment and the method of making and reconditioning the same, throughout which description reference will be made to the accompanying drawings wherein:

Figure 1 is a perspective view showing the thermoplastic material for the die being poured into its container or tub;

Figure 2 is a vertical, sectional view of the punch and die showing the die being cast to the punch;

Figure 3 is a view similar to Figure 2 with the punch raised from the completed die, the broken lines indicating material that has been removed from the upper surface of the die;

Figure 4 is a view similar to Figure 3 illustrating the manner of initially forming a sheet metal part in the tooling;

Figure 5 is a view similar to Figure 4 with the tooling partially formed;

Figure 6 is a view similar to Figure 5 showing the sheet metal part being formed between the punch and die;

Figure 7 is a vertical sectional view of the die in a worn or damaged condition after extended usage;

Figure 8 is a vertical sectional view of the punch and die nested together and arranged in an oven for the reconditioning or reshaping of the worn die; and Figure 9 is a vertical sectional view of the punch nested in the recast or reconditioned die.

Before explaining in detail the present invention, including the method or mode of making the dies and of reconditioning the same, it is to be understood that the invention is not to be limited in its application to the details of construction and arrangement of parts illustrated in the accompanying drawings since the invention is capable of other embodiments and of being practiced or carried out in various ways. It is to be understood that the phraseology or terminology employed herein is for the purpose of description and not of limitation and is not intended to limit the invention beyond the terms of the claims or the requirements of the prior art.

The tools illustrated in the drawings include a male die or punch 10 and a female die 11, which we will herein term the die. The punch and die 10 and 11 are, of course, shaped and related to impart the desired configuration to the sheet metal parts P to be formed or produced and the invention is not primarily concerned with the shape of the active end or face of the punch 10 or with the configuration of the cavity 12 in the die. In accordance with the broader aspects of the invention the punch 10 may be formed of any suitable or selected material and may be produced in any desired manner. Where the punch 10 is to be cast from a phenolic resin, or the like, a retainer or tub 13 is provided for the punch and in any event a tub 13, or the equivalent, may be provided for the punch whether it is formed of steel, Kirksite, or other material. In the particular case illustrated, it may be assumed that the punch 10 has been made to have its active surfaces correspond identically with the inside dimensions and shape of the part P to be produced, the punch having been formed by casting it of phenolic casting resin, or the like, in a plaster splash which, in turn, has been made from a plaster master having the same dimensions and shape as the parts P. However, as already pointed out, the mode of making the punch 10 is not of prime importance to the present invention. A retainer or tub 14 is provided for the die 11. The tub 14 is preferably a strong, rigid, box-like structure constructed of steel plate, or the like, and reinforced by external buttresses, or gussets 15 to resist internal spreading forces.

The die 11 is made by covering the exposed surfaces of the punch 10 with a selected parting material, such as a graphite, and then pressure casting or molding the die directly from or to the punch. In accordance with the invention, the die 11 is cast of a thermo-plastic resin that is somewhat yielding at room temperatures; that is a thermo-plastic having a Shore hardness of between 80 and 105, the preferred Shore hardness being between 90 and 100. The die 11 may be cast of any appropriate hot melt casting resin of the thermo-plastic type having a Shore hardness within these ranges and that is meltable at moderately elevated temperatures of, say, between 200° and 350° F. Such resins usually contain waxes, fillers, plasticizers and ethyl cellulose, benzoyl cellulose, a mixture of ethyl cellulose and benzoyl cellulose, cellulose acetate, a polyamide (nylon), cellulose acetyl butyrate, etc. The selected thermoplastic mixed with its plasticizer is heated and agitated to assure a uniform mix and is then poured into the tub 14 as illustrated in Figure 1. The plastic may be allowed to cool somewhat before it is poured into the tub 14 and, in fact, it may be in a rather viscous state at the time it is poured.

After pouring the plastic into the tub 14 and while it is still in a liquid or semi-liquid state, the punch 10 is lowered into the tub to bear downwardly against the plastic therein. A constant downward pressure is applied to the punch 10 to press it against the plastic of the die 11. In cases where the punch 10 and its associated tub 13 are heavy, this weight may be sufficient to apply the desired pressure to the plastic in the tub 14 while in other cases hydraulic or mechanical pressure may be exerted on the punch assembly. As shown in Figure 2, the tub 13 of the punch 10 is adapted to fit downwardly within the tub 14 of the die 11 and the lower edge of the tub 13, which has been provided with an appropriate parting material, may bear against the upper surface of the plastic at the plane 16. The active contoured face of the punch 10 of course engages the plastic of the die 11 and the plastic is shaped or cast to the configuration and dimensions of the punch. The entire body of plastic in the tub 14 is under pressure, resulting from the weight of and/or downward pressure applied to the punch 10 so that the die 11 is cast under pressure to the contour of the punch 10 and the pressure is maintained until the plastic of the die 11 has set, cooled and hardened. The pressure casting of the die 11 directly on or to the punch 10 inhibits or prevents shrinking of the plastic of the die and the die surfaces have the same shape and dimensions as the punch 10. It is to be noted in this connection that it is unnecessary to make provision for the thickness or gage of the parts P to be formed, the somewhat yielding die being adapted to yield and compensate for this thickness in the actual operation of the tooling when forming the parts P. Where the die 11 is large or relatively large or where extreme accuracy is required, the surface regions of the die cavity 12, formed as above described, are heated by means of a torch, by radiant heating or otherwise to render the plastic soft or semi-liquid and the punch 10 is re-inserted in the cavity. A constant pressure or force is applied to the punch 10 while the surface plastic in the cavity is still liquid or semi-liquid to accurately shape or cast the die to the mold. In some cases where the shrinkage of a large die is excessive, liquid heated plastic of the same nature as the thermo-plastic of the die 11 is poured into the reheated cavity 12 before reinserting the punch 10 in the cavity. The subsequent pressure of the punch 10 in the cavity assures an integral bonding or welding of the added plastic to the plastic of the die and assures a very accurate die 11. The added plastic serves to compensate for excessive shrinkage of the die.

After the die 11 has set and hardened, the punch 10 is raised and the upper surface 18 of the die around the cavity 12 is cut or machined away for a depth of, say, ½ inch to allow suitable clearance between the tub 13 of the punch and the die 11 during the subsequent metal forming operations. The broken line 19 of Figure 3 indicates the plane of the top surface of the die 11 prior to machining or cutting back the die to the surface 18.

The manner of using the punch 10 and die 11 in shaping or forming the part P will, of course, depend to some extent upon the intended shape of the parts P. The parts P are preferably provided with a suitable lubricant prior to being shaped or formed between the punch and die. Where the parts P have gradual contours and are shallow drawn, they may readily be formed directly to the punch 10 and die 11 either by drop hammer impact-forming or by constant pressure hydraulic press forming. In other cases where the die cavity 12 is rather deep and/or the contours are sharp, it may be desired or necessary to arrange blocks or sheets 17 of rubber, or the like, in the cavity, as shown in Figure 4, so that the initial operations merely partially shape or form the part P and draw the required material into the die. This is common practice in the art. Figure 4 shows a part P as partially formed in this manner. The rubber 17 is removed from the die 11 preparatory to the final forming operations.

In finally forming the part P or in forming the part P where initial partial forming is not required, the punch 10 operated either by a drop hammer to give the part one or more blows or operated by a hydraulic press, or the like, to impart a constant pressure to the part, co-operates with the die 11 to form the part to the desired shape. In either case, the plastic of the die 11 yields to the extent that it flows around the part P to cause the part to accurately conform to the surfaces of the punch. The yielding flowing plastic of the die 11 cooperates with the unyielding punch 10 to stretch the part P over the punch causing the part to accurately assume the contour of the punch. Thus the ability of the die 11 to yield and flow to a limited extent assures the accurate forming of the part P. Further, the yieldability of the die 11 avoids scratching and impact marks of the part P by either the die or punch and avoids damage to the punch. The die 11, by reason of its Shore hardness of from 80 to 105, will not crack or fracture and is very long wearing. The tub 14, being rigid and unyielding, resists lateral spreading and displacement of the plastic of the die 11 during operation of the tooling, assuring the desired conforming or flowing of the plastic around the part P and to the dimensions and configuration of the punch. It will be seen that where the die 11 is formed of a somewhat yielding plastic, as above described, it automatically compensates for the gage or thickness of the sheet metal part P when the same is formed to the punch, making it unnecessary to take this thickness into account when forming the die. The ability of the die to yield and conform with the punch 10 adapts the die for usage even after it has become worn to a considerable extent, the die being capable of forming accurate parts P after considerable wear.

In the event the die 11 becomes nicked, scratched, or develops other imperfections after usage, these may be remedied by locally heating and shaping the damaged portion. By locally heating the die 11 to a semi-plastic condition the damaged region may be readily reworked or reshaped. If necessary, plastic of the same nature as the plastic of the die 11 may be added at the damaged area to bring the surface of the die out to the proper contour and dimensions.

After extended usage the die 11 may become worn to the extent that it requires reconditioning. Figure 7 of the drawings illustrates, in an exaggerated manner, the die 11 worn to the extent that it requires reconditioning. In accordance with the invention the die 11 may be easily and quickly reshaped for further use. To accomplish this the punch 10 is provided with a parting material and is then nested in the die 11. The assembly of the die and punch is then raised to a temperature sufficient to render the plastic of the die 11 semi-liquid and is maintained at that temperature for a sufficient length of time to cause the die 11 to shape itself to the punch 10. Figure 8 of the drawings shows the assembly of the punch 10 and die 11 with their respective tubs 13 and 14 in an oven 25 for this reconditioning of the die. In practice, it has been found sufficient to raise the temperature of the die and punch assembly to approximately 200° F. and to maintain it at that temperature for approximately eight hours, whereupon the assembly may be withdrawn from the oven 30 and allowed to air cool. When this procedure is followed, the thermo-plastic material of the die 11 is caused to again accurately conform with the surfaces of the punch 10, the weight of the punch 10 and its tub 13 usually being sufficient to place the semi-liquid plastic of the die 11 under sufficient pressure to assure the accurate shaping of the die to the punch. This pressure-reconditioning or reshaping of the die is unaccompanied by any appreciable shrinkage of the die and after the reconditioning the die is again ready for further usage. However, where the die 11 is large or has become worn to a substantial degree, additional plastic in a liquid state may be poured into the die cavity 12 after an initial heating of the die to be welded or bonded to the plastic of the die when the punch 10 is inserted in the cavity and pressed therein to shape or reshape the die cavity. The die 11 may be reconditioned, as described, for several times or indefinitely so long as the tooling is required for the forming of the parts P.

When the particular punch and die assembly is no longer required for the forming of the parts P the plastic constituting the die 11 may, if desired, be heated to a liquid or semi-liquid condition and poured from the tub 14 for subsequent use in the casting of another die, or the like. On the other hand, if desired, the plastic of the used die 11 may be heated to the liquid or semi-liquid state and another punch of a different or of the same configuration may be lowered into the tub 14 to again cast a female die to the new or second punch. Thus the material constituting the die 11 is capable of repeated reuse either in the same tub 14 or in a different retainer.

Having described only typical forms of the invention we do not wish to be limited to the specific details herein set forth, but wish to reserve to ourselves any variations or modifications that may appear to those skilled in the art and fall within the scope of the following claim.

We claim:

The method of repairing a thermoplastic female die which comprises placing the female die within a female die retainer to form a female die assembly, adding additional liquid plastic of the same material as that of the female die to the upper surface of said female die, inserting a male die assembly into said female die retainer and in contact with said upper surface of the female die and the additional liquid material, allowing the weight of said male die assembly to exert a constant downward pressure upon the entire body of the plastic in the female die retainer including the additional liquid plastic, raising the temperature of the die assemblies to but not above the lower limit of the melting point range of the thermoplastic material and maintaining said temperature and pressure until the entire female die is in a semi-liquid condition, removing said male die assembly from said female die assembly, and air cooling said female die to set and harden said female die.

References Cited in the file of this patent
UNITED STATES PATENTS

| | | |
|---|---|---|
| 1,709,328 | Stover | Apr. 16, 1929 |
| 1,834,763 | Bonsieur | Dec. 1, 1931 |
| 1,854,630 | Sickler | Apr. 19, 1932 |
| 2,039,105 | Neary | Apr. 28, 1936 |
| 2,119,590 | MacDonald | June 7, 1938 |
| 2,232,475 | Renfrew et al. | Feb. 18, 1941 |
| 2,319,014 | Smith | May 11, 1943 |
| 2,337,036 | Erdle | Dec. 21, 1943 |
| 2,385,318 | Wiley | Sept. 18, 1945 |
| 2,388,776 | Wallace | Nov. 13, 1945 |
| 2,428,697 | Champer | Oct. 7, 1947 |
| 2,460,242 | Renaud | Jan. 25, 1949 |

OTHER REFERENCES

Ser. No. 342,900, Fickert (A. P. C.), published Apr. 27, 1943.